US010895246B2

(12) United States Patent
Frydendal (10) Patent No.: US 10,895,246 B2
(45) Date of Patent: Jan. 19, 2021

(54) METHOD FOR PREDICTING AND CONTROLLING LOADS ON A WIND TURBINE AND A WIND TURBINE THEREOF

(71) Applicant: Envision Energy (Denmark) ApS, Silkeborg (DK)

(72) Inventor: Ib Frydendal, Føvling (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 120 days.

(21) Appl. No.: 15/738,654

(22) PCT Filed: Jun. 30, 2016

(86) PCT No.: PCT/DK2016/050232
§ 371 (c)(1),
(2) Date: Dec. 21, 2017

(87) PCT Pub. No.: WO2017/005266
PCT Pub. Date: Jan. 12, 2017

(65) Prior Publication Data
US 2018/0187651 A1    Jul. 5, 2018

(30) Foreign Application Priority Data
Jul. 3, 2015  (DK) ................................ 2015 00382

(51) Int. Cl.
*F03D 7/02* (2006.01)
*F03D 7/04* (2006.01)
(Continued)

(52) U.S. Cl.
CPC ......... *F03D 7/0292* (2013.01); *F03D 7/0224* (2013.01); *F03D 7/0264* (2013.01);
(Continued)

(58) Field of Classification Search
CPC combination set(s) only.
See application file for complete search history.

(56) References Cited

U.S. PATENT DOCUMENTS

| 2003/0120402 A1* | 6/2003 | Jaw ..................... G01M 15/00 702/182 |
| 2004/0057828 A1 | 3/2004 | Bosche |

(Continued)

FOREIGN PATENT DOCUMENTS

| CN | 101730796 A | 6/2010 |
| CN | 101793235 A | 8/2010 |

(Continued)

*Primary Examiner* — Rocio Del Mar Perez-Velez
*Assistant Examiner* — Hung H Dang
(74) *Attorney, Agent, or Firm* — James Creighton Wray (57) ABSTRACT

The present invention relates to a control method and a wind turbine configured to determine a load signal of at least one component of the wind turbine, and to calculate a damage rate based on this load signal. The control method calculates and monitors the damage rate in real-time, wherein the damage rate is normalised by using a first function defining a first transition phase. A second function is afterwards applied to the normalised damage rate which defines a second transition phase. These transition phases allows for a smooth transition between different operating modes of the wind turbine. The control method may further change the power output of the wind turbine relative to the nominal power output when the output signal of the second function is determined to be stable over at least one time period.

15 Claims, 3 Drawing Sheets

(51) Int. Cl.
*F03D 17/00* (2016.01)
*G05B 13/02* (2006.01)

(52) U.S. Cl.
CPC ........... *F03D 7/0276* (2013.01); *F03D 7/043* (2013.01); *F03D 17/00* (2016.05); *G05B 13/026* (2013.01); *F05B 2270/1095* (2013.01); *F05B 2270/32* (2013.01); *F05B 2270/331* (2013.01); *F05B 2270/332* (2013.01); *F05B 2270/807* (2013.01); *F05B 2270/808* (2013.01); *Y02E 10/72* (2013.01)

(56) References Cited

U.S. PATENT DOCUMENTS

| | | | |
|---|---|---|---|
| 2007/0057517 A1* | 3/2007 | McNerney | F03D 7/0224 290/44 |
| 2008/0086281 A1 | 4/2008 | Santos | |
| 2010/0038909 A1 | 2/2010 | Andersen | |
| 2011/0115224 A1* | 5/2011 | Lausen | F03D 7/0204 290/44 |
| 2012/0029892 A1 | 2/2012 | Thulke | |
| 2012/0035864 A1 | 2/2012 | Frydendal | |
| 2014/0015251 A1* | 1/2014 | Hammerum | F03D 7/0264 290/44 |

FOREIGN PATENT DOCUMENTS

| | | |
|---|---|---|
| CN | 102782318 A | 11/2012 |
| CN | 102788697 A | 11/2012 |
| CN | 103277252 A | 9/2013 |
| EP | 2302207 A1 | 3/2011 |
| EP | 2853730 A1 | 4/2015 |
| WO | 2014121800 A1 | 8/2014 |
| WO | 2015051801 A1 | 4/2015 |

\* cited by examiner

METHOD FOR PREDICTING AND CONTROLLING LOADS ON A WIND TURBINE AND A WIND TURBINE THEREOF

FIELD OF THE INVENTION

The present invention relates to a control method for predicting and reducing loads on a wind turbine, wherein the operation of the wind turbine is gradually changed into or out of a load reduction operating mode depending on a real-time damage rate. The present invention further relates to a wind turbine configured to be operated according to said control method.

BACKGROUND OF THE INVENTION

It is known that the wind turbine, particularly the rotor, nacelle, drive train and upper part of the wind turbine tower, is subjected to dynamic loads resulting from winds hitting the wind turbine which leads to stresses and potential failures. The various components of the wind turbine must therefore be designed to withstand these loads, in particular the increased loads occurring during extreme wind conditions. In extreme situations, the wind turbine is normally shut down and the rotor is either positioned in a parked position so that the loads on the wind turbine blades are minimised or allowed to idle.

EP 2302207 A1 discloses an adaptive control method for controlling the loads of a wind turbine wherein sensors measure the mechanical loads of one or more structural components and a controller determines the accumulated load of these components and the accumulated operating time of the wind turbine. The controller then calculates a rate between the accumulated load and the accumulated operating time and compares this rate with a number of thresholds. The controller changes the normal operating mode to a reduced operating mode in which the power production and optionally the rotation speed is reduced dependent on this rate. This control method continuously regulates the operating mode and thus the power production so that the calculated rate does not exceed one second-per-second at any time. EP 2302207 A1 further states that the wind turbine is shut down if the power production is reduced to less than 70%. As the wind turbine is only subjected to severe loads in limited time periods, any structural surplus occurring outside these time periods is not taken into account by this control method.

US 2012/0035864 A1 discloses a method for determining the mechanical loads of a blade root of a wind turbine wherein sensors measure a load signal of a structural component. The load signal is continuously sampled and a controller counts the sampled load cycles and determined the accumulated load of the structural component. It is indicated that this accumulated load signal can be used to trigger a load protection of the wind turbine, however no details are provided.

WO 2015/051801 A1 discloses a load reduction control method wherein the controller determines the damage rate based load signals indicative of the flapwise moment of the wind turbine blades. A corrective function is applied to the measured load signal to remove the influence of any previously corrective actions and thus calculate a true indication of the loading. An asymmetric filter function is applied to the corrected load signal. The greatest maximum cyclic amplitude is then determined based on the filtered and un-filtered load signals. This amplitude value is normalised to generate a damage rate signal which is compared to a threshold value. A load control algorithm is activated when the threshold value is exceeded where the control algorithm activates a corrective pitching action. This pitching action is fully deployed when the maximum amplitude of the cyclic loading exceeds the threshold value. It is stated that the operational set point during this pitching action can be varied over time, however no further details are provided.

There is a need for an improved control method that allows the wind turbine to be operated in a safe mode that reduces the loads in severe load situations. There is a need for an improved control method that allows the wind turbine to compensate for the power production loss in a severe load situation.

OBJECT OF THE INVENTION

An object of the invention is to provide a control method that changes the operation of the wind turbine depending of the loads of the wind turbine.

An object of the invention is to provide a control method that allows severe loads to be reduced while limiting the reduction in power production.

DESCRIPTION OF THE INVENTION

An object of the invention is achieved by a method for controlling the operation of a wind turbine comprising a wind turbine tower, a nacelle arranged on top of the wind turbine tower, and a rotor with at least two wind turbine blades rotatably arranged relative to the nacelle, wherein the method comprises the steps of:

measuring at least one load signal of at least one component of the wind turbine, the at least one component being influenced by a wind load, calculating a damage rate based on said at least one load signal, determining a normalised damage rate by applying a first function to said damage rate, and evaluating said normalised damage rate in real-time, changing the operation of the wind turbine from a first operating mode to at least a second operating mode depending on the normalised damage rate by applying at least one control action to the wind turbine, wherein a zero amount of control action is applied in the first operating mode and a maximum amount of control action is applied in the at least second operating mode characterised in that the wind turbine is operated in a first transition phase between said first operating mode and said at least second operating mode, wherein the amount of control action applied is gradually changed as function of an output signal of the first function.

The term "load signal" defines any type of signal indicative of a wind load acting on the wind turbine, wherein said load signal is measured directly or indirectly on at least one component directly or indirectly influenced by the wind load. Said component may in example be, but not limited to, a wind turbine blade, a rotor hub, a rotation shaft, a nacelle, a wind turbine tower, a component of the drive train, or another suitable component. The term "gradually activated" defines that the load control algorithm is changed between a not activated stage and a fully activated stage as function of the damage rate, wherein this change is performed linearly, in steps, or in a non-linear manner as described later.

The present configuration provides an improved method for controlling the loads of the wind turbine which evaluates the damage rate in real-time or at least in near real-time. The present method looks at a current or instant value of the damage rate instead of looking at an accumulated value of the damage rate. Alternatively, the present method may evaluate the damage rate within a predetermined time window or over a predetermined number of previously calculated damage rates. The predetermined time window and/or number of previously calculated damage rates may be selected based on the behaviour of the wind turbine system and/or the latency of the control system. This allows the control method to detect both extreme loads occurring within a short time period and loads occurring over an extended time period, e.g. according to the Wöhler curve.

The damage rate is calculated based on one or more design parameters determined during the design of the wind turbine. In example, the averaged damage rate is one second-per-second [$^{sec}/_{sec}$] if the progressive load conditions are equivalent to the design conditions. The damage rate may be calculated based on the measured load data using any known algorithm. Thus, the wind turbine experiences a structural surplus relative to the design conditions when the damage rate is less than 1 $^{sec}/_{sec}$. The present method provides an improved load control method capable of utilizing this structural surplus when regulating the operation of the wind turbine.

In the first operating mode, e.g. a normal operating mode, the control signals used to operate the wind turbine are optimised so that the wind turbine produces a maximum or nominal power output depending on the measured wind speed. In the second operating mode, e.g. a safe mode or load protective mode, said control signals are adjusted so that the loads experienced in the wind turbine are reduced which, in turn, also leads to a reduced power production. The present method enables the loads to be reduced while limiting the power production loss.

In one embodiment, said first function comprises a first damage rate defining a lower output value of the first function and at least a second damage rate defining the upper output value of the first function, wherein said wind turbine is operated in said first transition phase when the normalised damage rate is greater than the first damage rate and less than the second damage rate.

The present method evaluates the calculated damage rate in real-time thus generating a current damage rate indicative of a current load situation of the wind turbine. This current damage rate is then normalised which in turn is used to determine the desired operating mode of the wind turbine. The operation of said wind turbine is thus adjusted according to a current load situation whereas in conventional control methods, such as in EP 2302207 A1, said operation is adapted according to an accumulated load situation.

The normalised damage rate, i.e. the output signal of the first function, provides a better representation of the actual loads in the wind turbine whereas in conventional load control methods said current damage rate is summed into an accumulated value. Said normalisation further converts the calculated signal, e.g. the calculated damage rate, into a signal having a well-defined predetermined range which is more suitable for further processing within the controller.

The load data are normalised by applying a first function, i.e. a normalisation function, to the calculated damage rate. The first function includes at least one line segment, e.g. a first line segment, indicative of the amount of control action applied during the first transition phase. This transition phase may be defined by an open-ended or closed range of values of the normalised damage rate. The first and second damage rates may define the end points of this first line segment. These end points may optionally be adjusted based on the load data, e.g. the calculated damage rate, thus allowing this transition phase to be updated according to the actual load data of said wind turbine. This allows for a smooth or soft transition from the first operating mode to the second operating mode, or vice versa, unlike conventional load control method which describes a abrupt or instantaneous transition between the respective operating modes, such as in WO 2015/051801 A1.

The present control method does not require the use of a corrective function in order to estimate the raw load data, nor does it require the use of an asymmetric function to determine greatest maximal amplitude. Unlike WO 2015/051801 A1, the present control method adjusts the amount of control action applied as function of the actual damage rate which allows the controller to apply only the amount of corrective action needed to reduce the actual loading. In conventional control methods, a constant or fixed amount of control action, i.e. 100%, is applied each time the load control algorithm is activated.

This further enables the various control actions of the wind turbine to be gradually activated depending on the increasing value of the normalised damage rate. This in turn allows for a more controlled adjustment of the moveable parts of the wind turbine. In the first transition phase, the amount of control action applied may be changed (increased) within a predetermined range defined by the first and second damage rates. The first damage rate may define a lower output value indicative of a minimum or zero amount of control action applied. The second damage rate may define an upper output value indicative of a maximum amount of control action applied. Said "controlled adjustment" means that the motion of said control actions is carried out at a lower speed or in smaller intervals compared to conventional control methods.

In one embodiment, the method further comprises the steps of:
  decreasing the normalised damage rate by applying a second function to the normalised damage rate,
  further operating the wind turbine in a second transition phase between said first operating mode and said at least second operating mode, wherein the amount of control action applied is gradually changed as function of an output signal of the second function.

Similar to that of the first function, the control actions of the wind turbine may also be gradually deactivated depending on the decreasing value of the normalised damage rate. In the second transition phase, the amount of control action applied may be changed (decreased) between the lower output value and the upper output value as described above. The second function is descriptive of a controlled decrease of the normalised damage rate and, thus, the amount of control action applied. In conventional control methods, such as in WO 2015/051801 A1, no control of the decrease in damage rate is provided. This, in turn, further contributes to a more controlled adjustment of the moveable parts of the wind turbine, as mentioned above. This gradual deactivation of the control actions may be defined by a second transition phase between the first and second operating modes.

The second function, i.e. a delay function, may be applied to the normalised damage rate, e.g. when a negative slope or decrease of the damage rate is detected. This second function defines another smooth or soft transition phase between the first and second operating modes. This second function may include at least one line segment, e.g. another first line segment, indicative of the amount of control action applied during this second transition phase. The second function may differ from the first function. In example, the first function may be a positive increasing function extending from the lower output level, e.g. zero or minimum amount of control action, towards the upper output level, e.g. maximum amount of control action, while the second function may be a negative decreasing function extending from the upper output level towards the lower output level.

In example, maximum amount of control action applied refers to 100% of a predetermined power output, rotational speed of the rotor, or pitch angle of a wind turbine blade. Zero amount of control action applied refers to 0% of said predetermined power output, rotational speed, or pitch angle. The present load control algorithm allows 10%, 20%, 30%, 40%, 50%, 60%, 70%, 80%, 90%, or any other values of said predetermined power output, rotational speed, or pitch angle to be applied dependent of the actual loading situation, e.g. the damage rate. Conventional control methods do not allow for a gradual activation as indicated above.

In a special embodiment, the method further comprises the steps of:
  monitoring the output signal of said second function to determine when the output signal has stabilised relative to at least one predetermined output level, and
  operating the wind turbine in a third operating mode in which a power output of the wind turbine is changed relative to a nominal power output when said output signal is determined to be stable.

The output signal of the second function may be used to indicate when it is safe to increase the power production. In example, the problem of limiting the power production loss may be solved by monitoring the output signal from the second function and determining when this output signal has stabilised relative to one or more predetermined output levels within at least one time window. Each output level may be an output band defined by a lower and an upper limit. If the output signal is determined to be stable relative to this output level, e.g. remain within the lower and upper limits, then the wind turbine may be operated according to a third operating mode in which said control signals are adjusted so that the power output is changed, i.e. increased or decreased, by a predetermined percentage or power output.

The output signal may further be analysed over two or more time windows, e.g. consecutive time windows, for determining whether the output signal remains stable or not. If the output signal is determined to be stable, then the power output may be gradually changed, e.g. in steps or continuously, to a maximum or minimum percentage or power output. Said predetermined percentage or maximum/minimum percentage may be between 0.5% and 5% of the nominal power output, or even higher. Said steps may be between 0.1% and 1% of the nominal power output. The power output may accordingly be reduced towards this nominal value in a reversed order once the output signal becomes unstable over at least one time window. Alternatively, said power output may be reduced if said output signal is unstable over two or more time windows.

This enables the present method to increase the power production of the wind turbine after an extreme load event so that the overall power production loss is reduced. This effect cannot be obtained using conventional load control methods. In example, the gain of EP 2302207 A1 defines a reduction in power or rotational speed; not an increase in said power or rotational speed.

In a further special embodiment, the method further comprises the steps of:
  measuring a wind speed acting on said wind turbine, and
  wherein the power output of said wind turbine is further changed based on the measured wind speed.

In the third operating mode, said output signal may be combined with the measurement of the wind speed to determine the change of said power output. The wind speed may similarly be monitored to further indicate when it is safe to increase power production. The power output may be changed if the wind speed is determined to be within a predetermined range, e.g. below a predetermined threshold or within a predetermined band defined by a lower and an upper wind speed. If both the output signal and the wind satisfy the above-mentioned criteria, then the power output may be changed as mentioned above.

Optionally, the wind speed may further be analysed within the same two or more time windows as the output signal as mentioned above.

The present method further enables the power production to be increased when both the damage rate and the wind speed are within safe operating ranges.

In one embodiment, a low-pass filter, preferably an impulse response, is applied to the calculated damage rate prior to normalising the damage rate.

The calculated damage rate presents a very spiky and curved signal, when seen over time, which is less suitable for use as a control signal. This problem may be solved by filtering the calculated damage rate prior to normalising said damage rate. Preferably an electrical or digital low-pass filter, e.g. in the form of a finite or infinite impulse response, is applied to the calculated signal. This provides a signal better suited as a control signal while allowing for a fast response to any sudden changes in the damage rate. The first function is then applied to this filtered damage rate for normalising the damage rate.

In one embodiment, at least one of the first and second functions is at least a ramping function, a stepped function, a S-function, or an incrementing function.

As mentioned earlier, two different functions describing different transition phases may be applied to the calculated damage rate. In a preferred configuration, one or both functions are configured as a ramping function having at least one ramping segment. This ramping segment indicates a transition area in which the operation of the wind turbine is gradually changed between two operating modes. The first function may in example further comprise two line segments located on either side of this ramping line segment which is defined by the first and second damage rates. Each of said two line segments may have a slope of zero. A first of the line segments may be indicative of a first operating area in which the wind turbine is operated according to the first operating mode. In the first operating mode, the control action may be applied. A second of the line segments may be indicative of a second operating area in which the wind turbine is operated according to the second operating mode. In the second operating mode, the control action may be fully applied. Said first damage rate may be selected between 0 and 5. Said second damage rate may be selected between 5 and 10. This allows for a smooth transition between operating modes and a more controlled adjustment of the various components of the wind turbine as mentioned earlier.

The ramping segment of the second function may in example have a fixed slope, e.g. determined by the range of the normalised damage rate and/or a predetermined time length. This ramping segment may instead have a fixed time length and/or a variable slope. This allows the output of the second function to act as a warning level, since the extreme loads, which are detectable as peak in the damage rate, often occur in groups. Should another peak be detected during this ramping procedure, then it is compared to the current value of the ramped function, i.e. the output value of the second function. If the peak value is below the output value of the second function, then no further actions is taken, i.e. the ramping procedure is continued. If the peak value exceeds the output value of the second function, then only a reduced adjustment of the wind turbine is required, i.e. the wind turbine is operated in the first transition phase ad described earlier. When the normalised damage rate starts to decrease again, the output value of the second function is ramped down as described above. The predetermined/fixed time length may be between 60 sec and 7200 sec.

In one embodiment, the at least one load signal is at least one of:
- a bending moment of the wind turbine tower,
- a bending moment of a blade root of one of the wind turbine blades, or
- an acceleration signal measured relative to the direction of the wind.

The load signal may be measured directly on one or more of the components of the wind turbine. Preferably, this load signal is measured as a bending moment of the wind turbine tower or of the blade root of a selected wind turbine blade. Other load signals may be measured and used as an input for this present method.

In one embodiment, said step of measuring at least one load signal comprises measuring a signal, preferably a vibration signal, using at least one sensor, and calculating the at least one load signal based on the measured signal.

Alternatively, vibrations may be measured on one or more of the components of the wind turbine and a controller may then calculate the load signal based on these measured vibrations. Preferably, said vibrations are measured as accelerations of the rotor and thus the nacelle along the direction of the wind. Other signals may be measured, e.g. the wind speed, pitch activity, rotational speed, tilting angle of the wind turbine tower or another suitable signal, and used to calculate or estimate the load signal.

Two or more measured signals may be combined wherein the load signal may be calculated based on these measured signals. Said two or more measured signals may be directly measured load signals, signals indicative of a wind load, or any combinations thereof.

The damage rate may in example be predicted or calculated by using a rainflow-counting algorithm, a cycle counting algorithm, or another suitable algorithm. The design parameters may be used as variables in this algorithm and the signals from one or more sensors may be used as inputs. The output of this algorithm defines the load signal which in turn is used to control the operation of the wind turbine. Preferably, the present method enables the loads to be determined in real-time, e.g. by counting load cycles in real-time, whereas conventional control methods determines the loads over a time period of 10 minutes.

In one embodiment, at least one of the following control actions is carried out in the at least second operating mode:
- reducing a power output of the wind turbine,
- reducing a rotational speed of the rotor,
- offsetting a pitch angle of at least one of the wind turbine blades,
- preforming a shut-down or emergency stop procedure, or
- performing a peak shaving of at least one control signal of the wind turbine when a measured wind speed is within a transition area.

In the first operating mode, the control signals are set at optimal values so that the wind turbine is operated to produce a maximum or nominal amount of power. In the second operating mode, one or more control actions are performed on the wind turbine so that the actual loads are reduced. In an exemplary configuration, the power output, the rotational speed of the rotor, the pitch angle(s) of the wind turbine blades, or any combinations thereof may be adjusted to achieve this load reduction. In another exemplary configuration, a shut-down or emergency procedure may be performed in which the rotation of the rotor is stopped or idled and/or the wind turbine blades are placed in a parked position. In this shut-down or emergency procedure, the yaw mechanism may be locked in a predetermined yaw angle, or the yaw mechanism may be released so that the nacelle and rotor are able to track the wind direction.

In yet another exemplary configuration, the peak of the damage rate is shaved off when the measured wind speed is within a predetermined range relative to the rated wind speed. Said range may be defined by a first and a second wind speed. Alternatively, the peak shaving may be performed on another control signal, such as the thrust force acting on the rotor or the bending moment of the wind turbine tower. Said "peak shaving" is defined as adjusting the values of the respective control signal so that the peak of said control signal occurring at the steady state transition area is smoothed out. This reduces the loads of the wind turbine at wind speed around the rated wind speed.

In the respective first and second transition phases described above, these control signals may gradually be adjusted from their optimal power producing values towards their adjusted load reducing values, or vice versa. This adjustment may be determined based on the output signal of the first or second function, i.e. the normalised or decreased damage rate.

An object of the invention is also achieved by a wind turbine comprising a wind turbine tower, a nacelle arranged on top of the wind turbine tower, a rotor with at least two wind turbine blades rotatably arranged relative to the nacelle, and at least one controller configured to control the operation of the wind turbine and to change said operation between a first operating mode and at least a second operating mode, wherein the at least one controller is further configured to determine at least one load signal from at least one sensor arranged relative to at least one component of the wind turbine and to determine a damage rate based on this at least one load signal, the at least one controller is further configured to determine a normalised damage rate by applying a first function to said damage rate, the at least one controller is further configured to change the operation of the wind turbine from a first operating mode to at least a second operating mode depending on the normalised damage rate by applying at least one control action to the wind turbine, wherein a zero amount of control action is applied in the first operating mode and a maximum amount of control action is applied in the at least second operating mode, characterised in that the at least one controller is configured to operate the wind turbine in a first transition phase between said first operating mode and said at least second operating mode, wherein the at least one controller is configured to gradually change the amount of control action applied as function of the normalised damage rate.

The present method can suitably be implemented in a wind turbine control system which is connected to one or sensors arranged on or relative to the wind turbine. This allows the control system to monitor the loads of the respective wind turbine and adjust the operation of this wind turbine accordingly as described above. This enables the wind turbine control system to evaluate the damage rate in real-time or at least near real-time. This enables the wind turbine control system to detect and respond to both extreme loads, e.g. due to extreme wind conditions, and long-term loads, e.g. due to structural wear and tear of the components.

The present configuration allows the controller to gradually change the amount of control action applied as function of the actual damage rate whereas the controller in WO 2015/051801 A1 regulates the applied control action over time. This allows for an optimal load reduction while maintaining a minimum power loss.

As mentioned above, the controller is configured to apply at least a first function to the damage rate thus normalising the calculated damage rate. The controller is configured to change the operation of the wind turbine in accordance with the first function which defines the first transition phase. This provides a smoother control and thus less abrupt adjustment of the control signals during this transition phase between these operating modes compared to WO 2015/051801 A1 in which the control action is fully activated once the damage rate exceeds the threshold value. The controller may further be configured to apply a low-pass filter, e.g. an impulse response, to the calculated damage rate wherein this filtered damage rate is used as input for the first function. This provides a more suited input signal for the further analysis in the controller.

In one embodiment, the at least one controller is further configured to determine a decreased damage rate by applying a second function to the normalised damage rate, and to further gradually change the amount of control action applied as function of the decrease damage rate.

The controller may be configured to further apply a second function to this normalised damage rate which defines the second transition phase. The second function is preferably applied when the controller determines that the damage rate starts to decrease towards zero. This enables the output signal of this second function, e.g. the creased damage rate, to act as a warning signal indicating the probability of another severe load event occurring shortly thereafter. The load reduction method of WO 2015/051801 A1 does not take into account such load events occurring shortly thereafter, and thus require a full action of the load reduction control again.

The wind turbine control system, e.g. the controller, is configured to determine the proper control action based on this warning signal and/or the normalised damage rate, as described above.

In one embodiment, the at least one controller is further configured to determine when the decreased damage rate has stabilised relative to at least one predetermined output level, and to operate the wind turbine in a third operating mode in which a power output of the wind turbine is changed relative to a nominal power output when said decreased damage rate is determined to be stable.

The output signal of the second function may further be used to indicate when it is safe to increase the power production. If the output signal is stable over at least one time window relative to this output level, e.g. remain within the lower and upper limits, then the controller may operate the wind turbine according to a third operating mode in which said control signals are adjusted so that the power output is changed by a predetermined percentage or power output. The controller may gradually change the power output towards a maximum or minimum percentage or power output if the output signal continues to be stable. When the output signal starts to become unstable, the controller may gradually change the power output back towards the nominal power output. This allows the power production of the wind turbine to be increased after an extreme load event so that the overall power production loss can be reduced.

In one embodiment, the at least one sensor is configured to measure said at least one load signal of the at least one component, or that the at least one controller is further configured to calculate the at least one load signal based on a measured signal from said at least one sensor.

One or more displacement sensors, e.g. accelerometers, position sensors or GPS-receivers, may be used to indirectly measure one or more load signals of the wind turbine. The controller is configured to process the measured signals from these sensors and calculate the load signal by means of a suitable algorithm implemented in the controller, as described above. The calculation of the damage rate may be carried out in the controller or in another controller, e.g. a remote controller.

Alternatively, one or more load sensors, e.g. strain gauges or force meters, may be used to directly measure the load signals of the wind turbine, wherein these load sensors are arranged on or inside one or more components of the wind turbine. The controller, or the another controller, is configured to receive the measured signals from these sensors and calculate the damage rate based on these load signals.

These sensors may be combined with other type of sensors, e.g. a wind speed sensor or a rotational speed sensor/decoder, arranged on or relative to the wind turbine.

In one embodiment, the at least one controller is a wind turbine controller arranged inside the wind turbine, wherein the at least one controller optionally comprises a communications module configured to communicate with another separate unit.

The wind turbine control system is preferably implemented as a local controller acting as the wind turbine control system for that wind turbine. This local controller may be configured to process and analyse the data measured by the sensors and to calculate and monitor the damage rate, as described above. The local controller may further be connected to a communications module configured to communicate with a corresponding communications module in a remote controller, e.g. of a central monitoring station. The data measured by the various sensors, the calculated/normalised damage rate, and/or the control signals may be transmitted to this remote controller for further analysis or storage.

In an alternative configuration, the data from these sensors are transmitted to the remote controller which is configured to calculate the damage rate based on the received data. The remote controller may further be configured to monitor the damage rate and to apply the first and second functions to the calculated damage rate as described above. The remote controller may then transmit the output signal back to the local controller which determines the respective operation mode and control signals thereof. Alternatively, the remote may also determine the respective operation mode and the control signals thereof which in turn are transmitted back to the local controller. The local controller may then adjust the operation of the wind turbine according to the control signals received from the remote controller.

DESCRIPTION OF THE DRAWING

The invention is described by example only and with reference to the drawings, wherein.

In the following text, the figures will be described one by one and the different parts and positions seen in the figures will be numbered with the same numbers in the different figures. Not all parts and positions indicated in a specific figure will necessarily be discussed together with that figure.

REFERENCE LIST

1. Wind turbine
2. Wind turbine tower
3. Nacelle
4. Yaw mechanism
5. Rotor
6. Wind turbine blades
7. Wind
8. Wind turbine control system, controller
9. Sensor
10. Communications module
11. Separate unit
12. Load signal
13. Calculated damage rate
14. Filtered damage rate
15. First damage rate
16. Second damage rate
17. Normalised damage rate
18. Lower output level
19. Upper output level
20. Peak
21. Output signal of first function
22. Output signal of second function

DETAILED DESCRIPTION OF THE INVENTION

Figure 1:
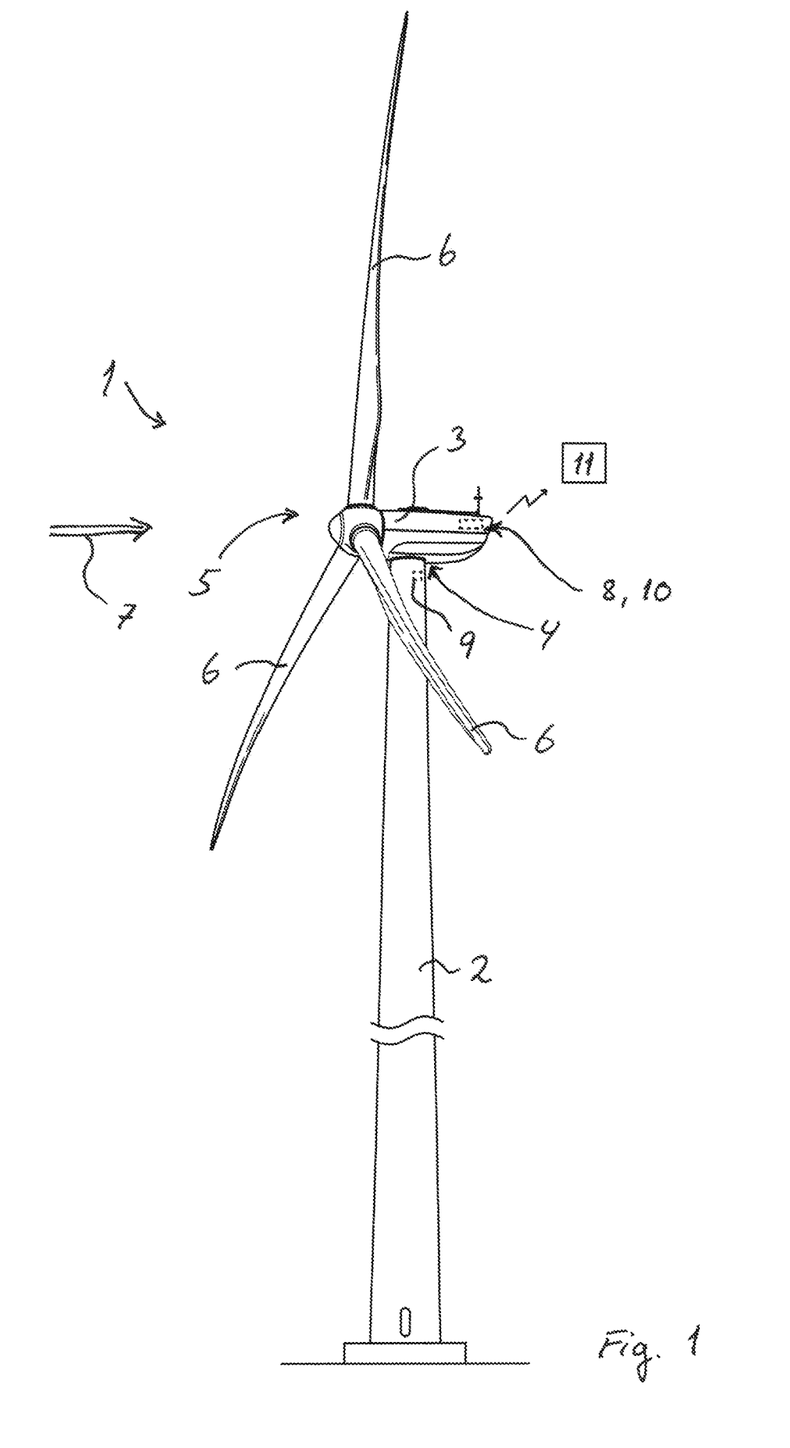
FIG. 1 shows an exemplary embodiment of a wind turbine.

FIG. 1 shows an exemplary embodiment of a wind turbine 1 comprising a wind turbine tower 2. A nacelle 3 is arranged on top of the wind turbine tower 2 wherein the nacelle 3 is connected to the wind turbine tower 2 via a yaw mechanism 4. A rotor 5 comprising at least two wind turbine blades 6, here three blades are shown, is rotatably connected to a drive train arranged inside the nacelle 3, e.g. via a rotation shaft. A wind 7 acts on the rotor 5 which in turn generates a wind load on the wind turbine 1.

A wind turbine control system 8 in the form of a local controller is arranged in the wind turbine 1 and is configured to control the operation of the wind turbine 1 according to different operating modes, as described later. At least one sensor 9 is electrically connected to the wind turbine control system 8 via a wired or wireless connection. The sensor 9 is configured to measure a load signal (shown in FIG. 2) of at least one component of the wind turbine 1. Here, the sensor 9 is shown as a displacement sensor configured to measure a signal indicative of the wind load.

The wind turbine control system 8 comprises a communications module 10 configured to communicate with a separate unit 11, e.g. a remote controller, via a second connection. The second connection is here shown as a wireless connection, however, a wired connection may be used instead.

Figure 2:
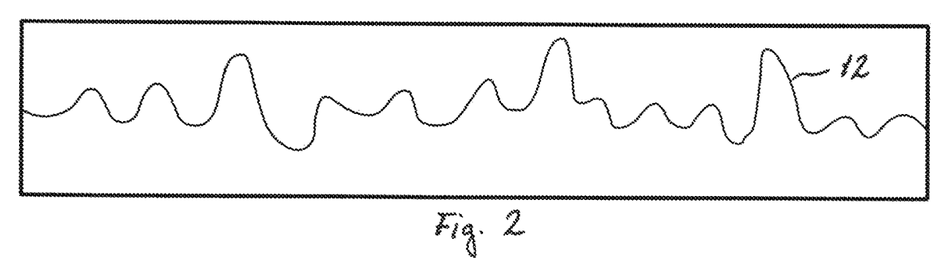
FIG. 2 shows an exemplary graph of the load signal.

FIG. 2 shows an exemplary graph of the load signal 12 measured by the sensor 9. The load signal 12 is preferably measured along the direction of the wind 7. The x-axis indicates time, e.g. in seconds, while the y-axis indicates the respective unit of the measured load signal 12, e.g. in Newton-meter or meter-per-second-squared.

Figure 3:
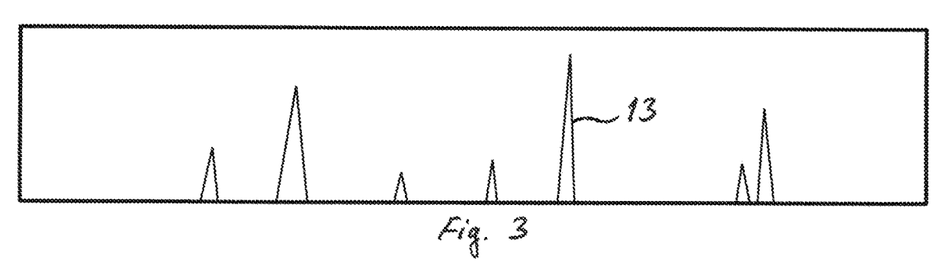
FIG. 3 shows an exemplary graph of the calculated rate.

FIG. 3 shows an exemplary graph of a damage rate 13 calculated based on the measured load signal 12. The damage rate 13 is calculated in real-time by applying a suitable algorithm to the measured load signal 12.

Figure 4:
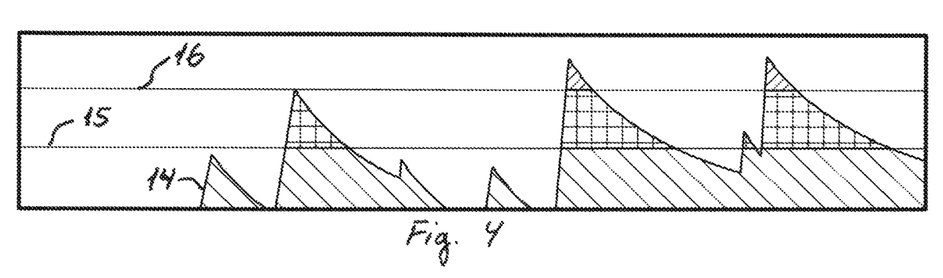
FIG. 4 shows an exemplary graph of a first function applied to the filtered damage rate.

FIG. 4 shows an exemplary graph of a low-pass filter applied to the calculated damage rate 13. Here, a low-pass filter in the form of an impulse response function is applied to the calculated damage rate 13. This filtered damage rate 14 provides a signal which is more suited as a control signal compared to the raw and calculated damage rate 13 shown in FIG. 3.

The graph further indicates a first function applied to the filtered damage rate 14 wherein the output of this first function defines a normalised damage rate. Here, a first function in the form of a ramping function is applied to the filtered damage rate 14. The first function comprises a first line segment where a first damage rate 15 and a second damage rate 16 define the end-points of this first line segment.

The wind turbine 1 is controlled according to a first operating mode by the wind turbine control system 8 when the current value of the damage rate is below the first damage rate 15. The wind turbine 1 is controlled according to a second operating mode by the wind turbine control system 8 when the current value of the damage rate is above the second damage rate 16. The first and second damage rates 15, 16 define a transition phase in which the operation of the wind turbine 1 is gradually changed between the first and second operating modes.

Figure 5:
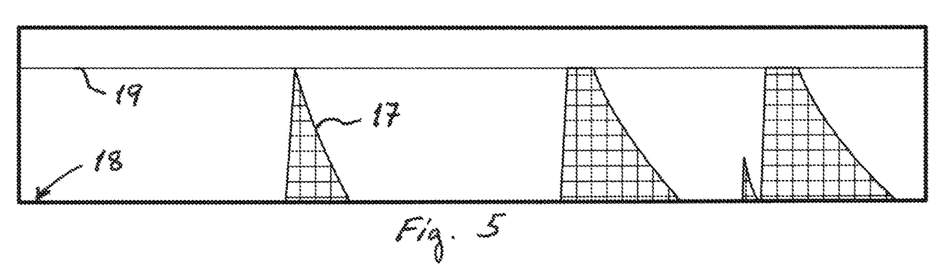
FIG. 5 shows an exemplary graph of the normalised damage rate.

FIG. 5 shows an exemplary graph of the normalised damage rate 17 wherein the range of the damage rate, e.g. the filtered damage rate 14, is defined by a lower output level 18 and an upper output level 19. The normalised damage rate 17 indicates an operating set-point of the wind turbine control system 8. The wind turbine control system 8 uses this operating set-point to determine the values of one or more control signals used to control the operation of the wind turbine 1.

Figure 6:
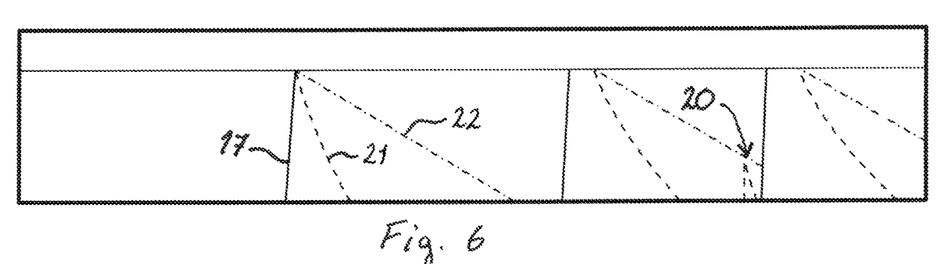
FIG. 6 shows an exemplary graph of a second function applied to the normalised damage rate.

FIG. 6 shows an exemplary graph of a second function applied to the normalised damage rate 17 wherein the output of the first or second function defines a decreased damage rate. This damage rate is used by the wind turbine control system 8 to determine one or more control actions as mentioned later. Here, a second function in the form of another ramping function is applied to the normalised damage rate 17 when a negative slope of the normalised damage rate 17 is detected.

The output of the second function is determined by a line segment extending from the upper output level 19 to the lower output level 18. This line segment has a predetermined slope so that the operating mode is gradually decreased from the upper level 19 towards the lower output level 18.

If the wind turbine control system detects another peak 20 of the normalised damage rate 17 during this ramp-down step, then the current output value 21 of the first function is compared to the current output value 22 of the second function. If the output value 21 of the first function is greater than the output value of the second function, then the output value 21 is used to determine the control action. If not, then the output value 22 is used to determine the control action.

Figure 7:
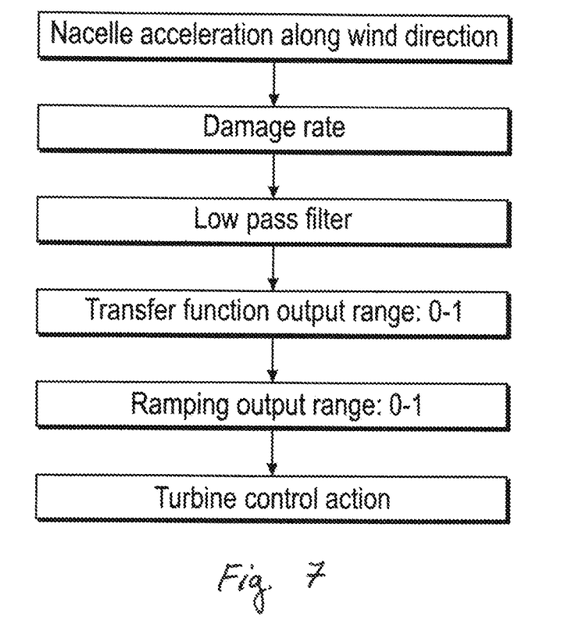
FIG. 7 shows a flowchart of a first embodiment of the control method.

FIG. 7 shows a flowchart of a first exemplary embodiment of a control method implemented in the wind turbine control system 8. In this first embodiment, the sensor 9 is configured to measure an acceleration signal of the nacelle 3 in the direction of the wind 7. The load signal and in turn the damage rate is then calculated based on the measured acceleration data from the sensor 9. The calculated damage rate is afterwards filtered using a low-pass filter.

This filtered damage rate is normalised using the first function, here the range of the filtered signal is normalised to a range between binary 'zero' and binary 'one'. The wind turbine 1 is thus changed from the first operating mode to the second operating mode. This normalised damage rate is afterwards ramped down using the second function, here the normalised damage rate is ramped down from 'one' to 'zero'. The wind turbine 1 is thus changed back from the second operating mode to the first operating mode.

The control action is gradually activated or deactivated depending on the current value of the output signals 21, 22, as mentioned earlier. In this embodiment, the control action in the second operating mode is selected so that the power output of the wind turbine 1 is reduced relative to a nominal power output in a severe load situation and reduced to normal the normal operating level when the severe load situation has passed.

Figure 8:
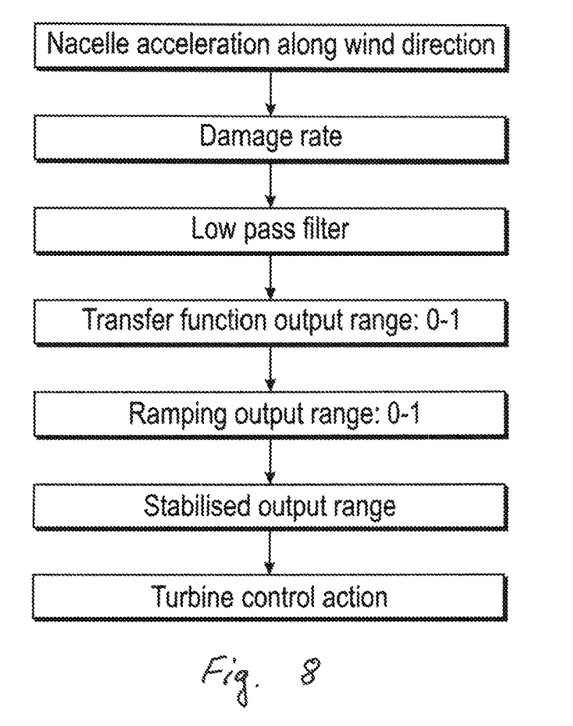
FIG. 8 shows a flowchart of a second embodiment of the control method.

FIG. 8 shows a flowchart of a second exemplary embodiment of the control method. In this embodiment, the control method differs from the first embodiment by further analysing the output signal 21, 22 of the first or second function before performing the control action.

If the output signal 21, 22 is determined to remain stable within at least one time window, then the wind turbine 1 is operated according to a third operating mode. In this third operating mode, the wind turbine control system 8 changes the power output depending on the current value of the damage rate. Preferably, the power output is increased to a maximum power output.

When the wind turbine control system determines that the output signal 21, 22 is unstable, then the power output is changed accordingly. Preferably, the power output is decreased to the nominal power output.

The invention claimed is:

1. A method of controlling the operation of a wind turbine between a first operating mode and at least a second operating mode, the wind turbine comprising a wind turbine tower, a nacelle arranged on top of the wind turbine tower, and a rotor with at least two wind turbine blades rotatably arranged relative to the nacelle, wherein the method comprises the steps of:
   measuring at least one load signal of at least one component of the wind turbine, the at least one component being influenced by a wind load,
   calculating a damage rate based on said at least one load signal, wherein the damage rate is calculated by using an algorithm, wherein one or more design parameters of the wind turbine are used as variables in the algorithm and the at least one load signal of at least one component of the wind turbine is used as input for the algorithm,
   determining a normalised damage rate by applying a first function to said damage rate, wherein the first function includes at least one line segment indicative of the amount of control action applied during a first transition phase, and
   evaluating said normalised damage rate in real-time, changing the operation of the wind turbine between
      the first operating mode where a zero amount of control action is applied and
      the at least a second operating mode where a maximum of control action is applied;
      wherein the change of operation depends on the normalised damage rate and is performed by applying at least one control action to the wind turbine,
   wherein operation of the wind turbine between the first operating mode and the at least second operating mode is in the first transition phase wherein the amount of control action applied is gradually changed as function of the normalised damage rate, wherein the gradual change is performed linearly, in steps, or in a non-linear manner.

2. A method according to claim 1, wherein said first function comprises a first damage rate defining a lower output value of the first function and at least a second damage rate defining an upper output value of the first function, wherein said wind turbine is operated in said first transition phase when the normalised damage rate is greater than the first damage rate and less than the second damage rate.

3. A method according to claim 1, wherein the method further comprises the steps of:
   detecting a decrease in the damage rate,
   applying a second function to the normalised damage rate, wherein the second function controls the decrease of the normalised damage rate,
   further operating the wind turbine in a second transition phase between said first operating mode and said at least second operating mode, wherein the amount of control action applied is gradually changed as function of the decreasing normalised damage rate.

4. A method according to claim 3, wherein the method further comprises the steps of:
   monitoring the decreasing normalised damage rate to determine when said decreasing normalised damage rate has stabilised relative to at least one predetermined output level, and
   operating the wind turbine in a third operating mode in which a power output of the wind turbine is changed relative to a nominal power output when said decreasing normalised damage rate is determined to be stable.

5. A method according to claim 4, wherein the method further comprises the steps of:
   measuring a wind speed acting on said wind turbine, and
   wherein the power output of said wind turbine is further changed based on the measured wind speed.

6. A method according to claim 1, wherein a low-pass filter, preferably an impulse response, is applied to the calculated damage rate prior to normalising the damage rate.

7. A method according to claim 1, wherein at least one of the first and second functions is at least a ramping function, a stepped function, a S-function, or an incrementing function.

8. A method according to claim 1, wherein the at least one load signal is at least one of:
   a bending moment of the wind turbine tower,
   a bending moment of a blade root of one of the wind turbine blades, or
   an acceleration signal measured relative to the direction of the wind.

9. A method according to claim 1, wherein at least one of the following control actions is carried out in the at least second operating mode:

reducing a power output of the wind turbine,
reducing a rotational speed of the rotor,
offsetting a pitch angle of at least one of the wind turbine blades,
preforming a shut-down or emergency stop procedure, or
performing a peak shaving of at least one control signal of the wind turbine when a measured wind speed is within a transition area.

10. A wind turbine comprising a wind turbine tower, a nacelle arranged on top of the wind turbine tower, a rotor with at least two wind turbine blades rotatably arranged relative to the nacelle, and at least one controller configured to control the operation of the wind turbine and to change said operation between a first operating mode and at least a second operating mode, wherein the at least one controller is further configured to determine at least one load signal from at least one sensor arranged relative to at least one component of the wind turbine and to determine a damage rate based on this at least one load signal, wherein the damage rate is calculated by using an algorithm, wherein one or more design parameters of the wind turbine are used as variables in the algorithm and the at least one load signal of at least one component of the wind turbine is used as input for the algorithm, the at least one controller is further configured to determine a normalised damage rate by applying a first function to said damage rate, wherein the first function includes at least one line segment indicative of the amount of control action applied during a first transition phase, the at least one controller is further configured to change the operation of the wind turbine between a first operating mode where a zero amount of control action is applied and at least a second operating mode where a maximum amount of control action is applied, where the controller is configured to change the operation depending on the normalised damage rate by applying at least one control action to the wind turbine, and, wherein the at least one controller is configured to operate the wind turbine in the first transition phase between said first operating mode and said at least second operating mode, wherein the at least one controller is configured to gradually change the amount of control action applied as function of the normalised damage rate, wherein the gradual change is performed linearly, in steps, or in a non-linear manner.

11. A wind turbine according to claim 10, wherein the at least one controller is further configured to detect a decrease in the normalised damage rate, to apply a second function to the normalised damage rate, wherein the second function controls the decrease of the normalised damage rate, and to further gradually change the amount of control action applied as function of the decreasing normalised damage rate.

12. A wind turbine according to claim 11, wherein the at least one controller is further configured to determine when the decreasing normalised damage rate has stabilised relative to at least one predetermined output level, and to operate the wind turbine in a third operating mode in which a power output of the wind turbine is changed relative to a nominal power output when said decreasing normalised damage rate is determined to be stable.

13. A wind turbine according to claim 10, wherein the at least one sensor is configured to measure said at least one load signal of the at least one component, or that the at least one controller is further configured to calculate the at least one load signal based on a measured signal from said at least one sensor.

14. A wind turbine according to claim 10, wherein the at least one controller is a wind turbine control system arranged in the wind turbine, wherein the at least one controller optionally comprises a communications module configured to communicate with another separate unit.

15. A wind turbine according to claim 10, wherein the at least one controller includes a low-pass filter configured to smooth the calculated damage rate prior to normalising the damage rate.

* * * * *